(12) United States Patent
Leon

(10) Patent No.: US 11,661,175 B2
(45) Date of Patent: May 30, 2023

(54) WIRELESS AUTOPILOT SYSTEM

(71) Applicant: Ruben Leon, Oviedo, FL (US)

(72) Inventor: Ruben Leon, Oviedo, FL (US)

(*) Notice: Subject to any disclaimer, the term of this patent is extended or adjusted under 35 U.S.C. 154(b) by 0 days.

(21) Appl. No.: 17/490,322

(22) Filed: Sep. 30, 2021

(65) Prior Publication Data
US 2022/0017210 A1    Jan. 20, 2022

Related U.S. Application Data

(63) Continuation-in-part of application No. 16/809,721, filed on Mar. 5, 2020, now Pat. No. 11,247,767.

(51) Int. Cl.
*B64C 13/18* (2006.01)
*B64C 13/50* (2006.01)

(52) U.S. Cl.
CPC ............. *B64C 13/18* (2013.01); *B64C 13/50* (2013.01)

(58) Field of Classification Search
CPC ........... B64C 13/18; B64C 13/50; B64C 9/02; B64C 9/04; B64C 9/10; B64C 9/30
See application file for complete search history.

(56) References Cited

U.S. PATENT DOCUMENTS

| | | | |
|---|---|---|---|
| 4,479,620 A * | 10/1984 | Rogers | B64C 9/00 244/90 R |
| 6,467,733 B1 | 10/2002 | Young et al. | |
| 6,474,945 B1 * | 11/2002 | Nakasato | B64C 27/615 29/889.7 |
| 7,607,611 B2 | 10/2009 | Wingett et al. | |
| 9,776,730 B1 * | 10/2017 | Leon | G01P 13/025 |
| 2002/0005461 A1 | 1/2002 | Nettle et al. | |
| 2009/0146003 A1 * | 6/2009 | Sheahan, Jr. | B64C 9/10 244/99.14 |
| 2010/0019083 A1 | 1/2010 | Sandin et al. | |
| 2017/0301155 A1 * | 10/2017 | Bowman | G07C 5/0816 |
| 2018/0301039 A1 * | 10/2018 | Leon | G08G 5/0013 |

* cited by examiner

*Primary Examiner* — Rodney A Bonnette
(74) *Attorney, Agent, or Firm* — Jason T. Daniel, Esq.; Daniel Law Offices, P.A.

(57) ABSTRACT

A wireless autopilot system includes a mounting plate for securement onto a flight control surface of an aircraft, an airfoil, and a flight control device. The flight control device is connected to the mounting plate, and an elongated bracket functions as an anti-flutter counterbalance. A servomotor is connected to the airfoil by the elongated bracket, and a controller having a wireless transceiver for communicating with an application on an externally located processor enabled device is located within the main body. Changes in the position of the servomotor during flight are instructed by the application, and result in a change to the orientation of the aircraft.

19 Claims, 7 Drawing Sheets

WIRELESS AUTOPILOT SYSTEM

CROSS-REFERENCE TO RELATED APPLICATIONS

This application is a continuation of and claims the benefit to U.S. application Ser. No. 16/809,721 filed on Mar. 5, 2020, the contents of which are incorporated herein by reference.

TECHNICAL FIELD

The present invention relates generally to aircraft flight systems, and more particularly to a wireless autopilot system.

BACKGROUND

The statements in this section merely provide background information related to the present disclosure and may not constitute prior art.

Unlike commercial aircraft which are loaded with advanced avionics, navigation, communication, and augmented visibility systems, most light aircraft are not required to carry such equipment. Indeed, many of the most popular light aircraft used today are manufactured with relatively rudimentary panel-mounted instrument packages such as analog altimeters, directional gyro, airspeed indicator, and artificial horizon, for example.

To this end, there are many known aftermarket devices which can be secured onto the airframe to perform certain tasks. For example, there are known autopilot systems which comprise a trim tab that is directly coupled to the control surface of the aircraft and is directly moved by a powerful trim motor that is capable of pushing the entire surface of the trim tab up and down to change the orientation of the aircraft during flight. The trim motor is physically wired to a console that is installed in the cockpit and receives power from the aircraft's onboard system.

Although useful, such control systems must be installed by certified aircraft mechanics and must interface with the aircraft's primary instrumentation panel, which may affect the primary certified instruments. When this occurs, aircraft owners must have the instruments recertified, which is an arduous and expensive proposition, thus further reducing the commercial viability of such devices.

Additionally, there are known aftermarket flight data systems that can be self-installed and do not access the primary instruments. Such systems are limited to simply capturing flight data information and providing the same to a user's device such as a smartphone or tablet, for example. Although these devices work well for their intended uses, they do not provide the device operator with the ability to control an operation of the aircraft itself.

Accordingly, it would be beneficial to provide a wireless autopilot device that can allow a user to control one or more flight operations of a certified aircraft, without the need to access the aircraft's primary instrumentation panel.

SUMMARY OF THE INVENTION

The present invention is directed to a wireless autopilot system for a manned aircraft. One embodiment of the present invention can include a mounting plate for securement onto a flight control surface of an aircraft. A flight control device can be connected to the mounting plate and can include functionality for changing an orientation of the aircraft during flight upon receiving a wireless instruction from a remote device.

In one embodiment, the autopilot system can include airfoil that is hingedly connected to the mounting plate, a system controller, and a wireless transceiver. A servo is connected to an elongated bracket that functions as an anti-flutter counterbalance.

In one embodiment, the autopilot system can include an application for execution on an externally located processor enabled device. The application can be encoded with instructions for communicating with the flight control device wirelessly to control an operation of the servomotor. Changes in the position of the servomotor during flight causing low pressure areas along both the airfoil and the flight control surface resulting in the change to the orientation of the aircraft.

In one embodiment, the system can include a power generation unit for generating sustained power for use by the system during flight.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
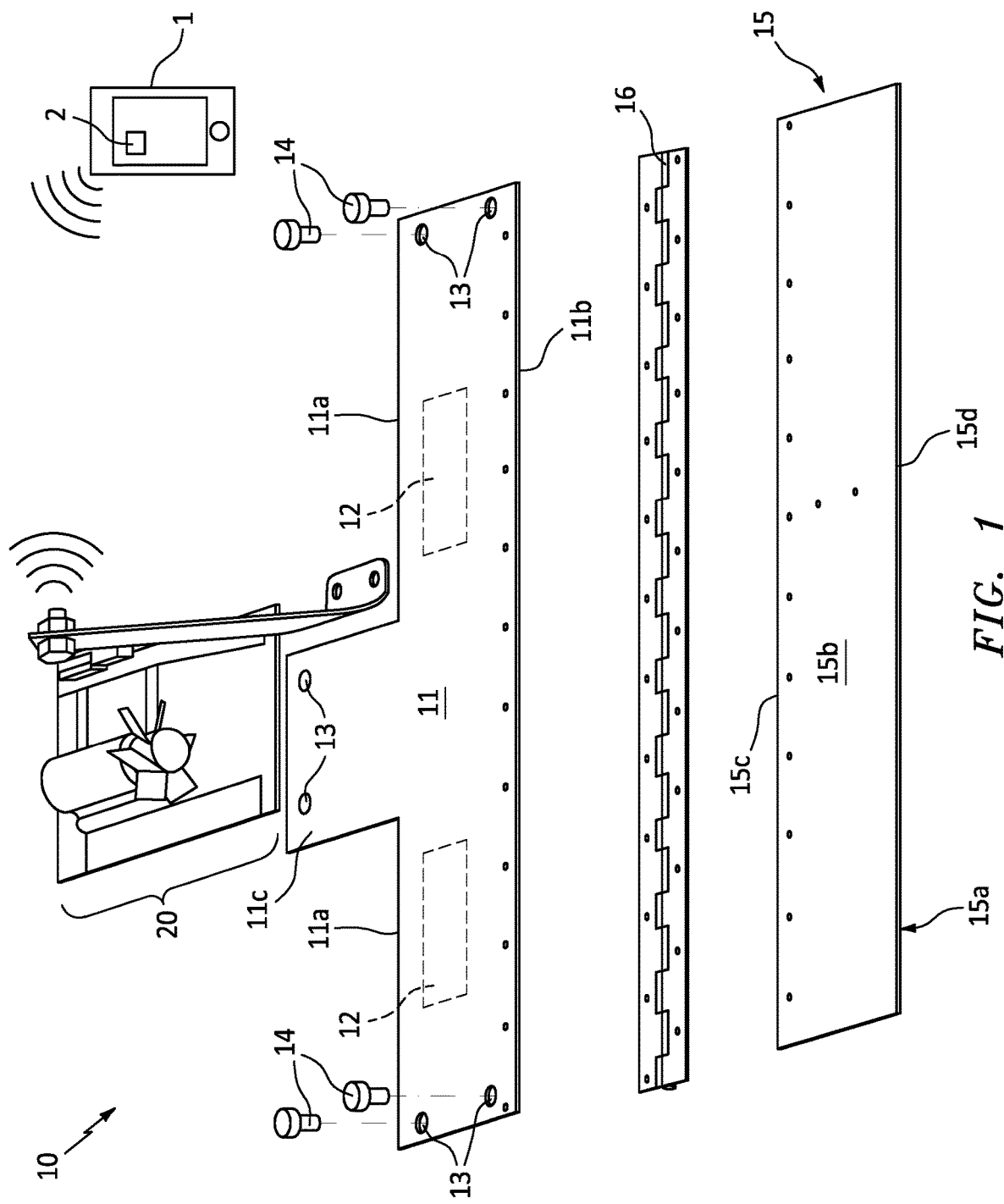
FIG. 1 is an exploded parts view of an exemplary autopilot system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "hingedly secured", "pivotally connected", "rotatably secured" and derivatives thereof shall be used interchangeably to describe a situation wherein two identified objects are joined together in a manner that allows one or both of the objects to move, pivot, and/or rotate about or in relation to the other object in one or both of a horizontal or vertical manner. Several nonlimiting examples of connectors for pivotally securing objects together include traditional single hinge mechanisms, ball joint couplers, and/or swivel flanges, for example. Likewise, the illustrated components may be formed together in a manner forming a living hinge, as is known in the art.

As described herein, the terms "change the orientation of the aircraft" refers to movement of the aircraft as a result of the operation of the autopilot system. Depending on the number of autopilot systems and/or the location of the autopilot system(s) this movement can include, comprise, or consist of changing or maintaining the aircraft's altitude, direction, bearing, heading, pitch, yaw and/or roll, for example.

Although described and illustrated for use with a certified aircraft, the inventive features described herein may be used for any number of other types of aircraft wherein an autopilot system is beneficial. Several examples include experimental aircraft, sport aircraft and the like. Accordingly, the system is not limited to the use of certified aircraft only.

FIGS. 1-6 illustrate one embodiment of a wireless autopilot system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, an exemplary embodiment of the wireless autopilot system 10 can include an aircraft attachment device 11, an airfoil 15, and a flight control device 20 for communicating wirelessly with a portable electronic device 1.

The aircraft attachment device 11 can function to secure the airfoil 15 and flight control device 20 onto a flight control surface of an aircraft. In one embodiment, the aircraft attachment device 11 can include an elongated mounting plate having a planar leading edge 11a a trailing edge 11b, and a protruding surface 11c extending from the trailing edge. The mounting plate will preferably be constructed from a generally planar piece of rugged material such as steel or aluminum, for example, however other construction materials are also contemplated.

In one embodiment, a plurality of openings 13 can be disposed along the mounting plate 11 for receiving rivets 14 or other fasteners capable of physically securing the device 11 onto the aircraft. Of course, any number of other components capable of permanently or removably securing the device 11 onto an aircraft are also contemplated. Several nonlimiting examples include removable connectors 12 such as double-sided tape, adhesives such as glue, liquid welds or resin, hook and loop material, strong magnets and/or compression fittings such as nuts/bolts snaps and screws, for example.

In one embodiment, an elongated hinge 16 can be positioned between the trailing edge 11b of the mounting plate 11, and the leading edge 15c of the below described airfoil 15. In one embodiment, the hinge can be formed from two sections can be selectively and removably joined together by a hinge rod to secure the devices 11 and 15 together in a manner that allows the airfoil to move independently of the attachment device in the manner described below. Although described as a single elongated hinge having two portions permanently affixed on the identified sections, any number of other devices capable of hingedly securing the components together are also contemplated.

In one embodiment, the airfoil 15 can function as a remotely operated flight control surface over which air passes. As will be described below, movement of the airfoil causes the aircraft to which the system 10 is secured to move in a specified manner so as to change the orientation of the aircraft. In one embodiment, the airfoil 15 can include an elongated, generally rectangular-shaped member having a top surface 15a, a bottom surface 15b, a leading edge 15c, and a trailing edge 15d.

Although described as including separate components, other embodiments are contemplated wherein mounting plate 11, the hinge 16 and the airfoil 15 are formed from a single piece of material and constructed such that the hinge 16 is formed as a living hinge (e.g., the hinge is a cut in the material to permit the rigid plate and rigid airfoil to bend along the line of the hinge).

As described herein, both the plate 11 and the airfoil 15 may be formed from materials that are, for example, relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

Figure 2:
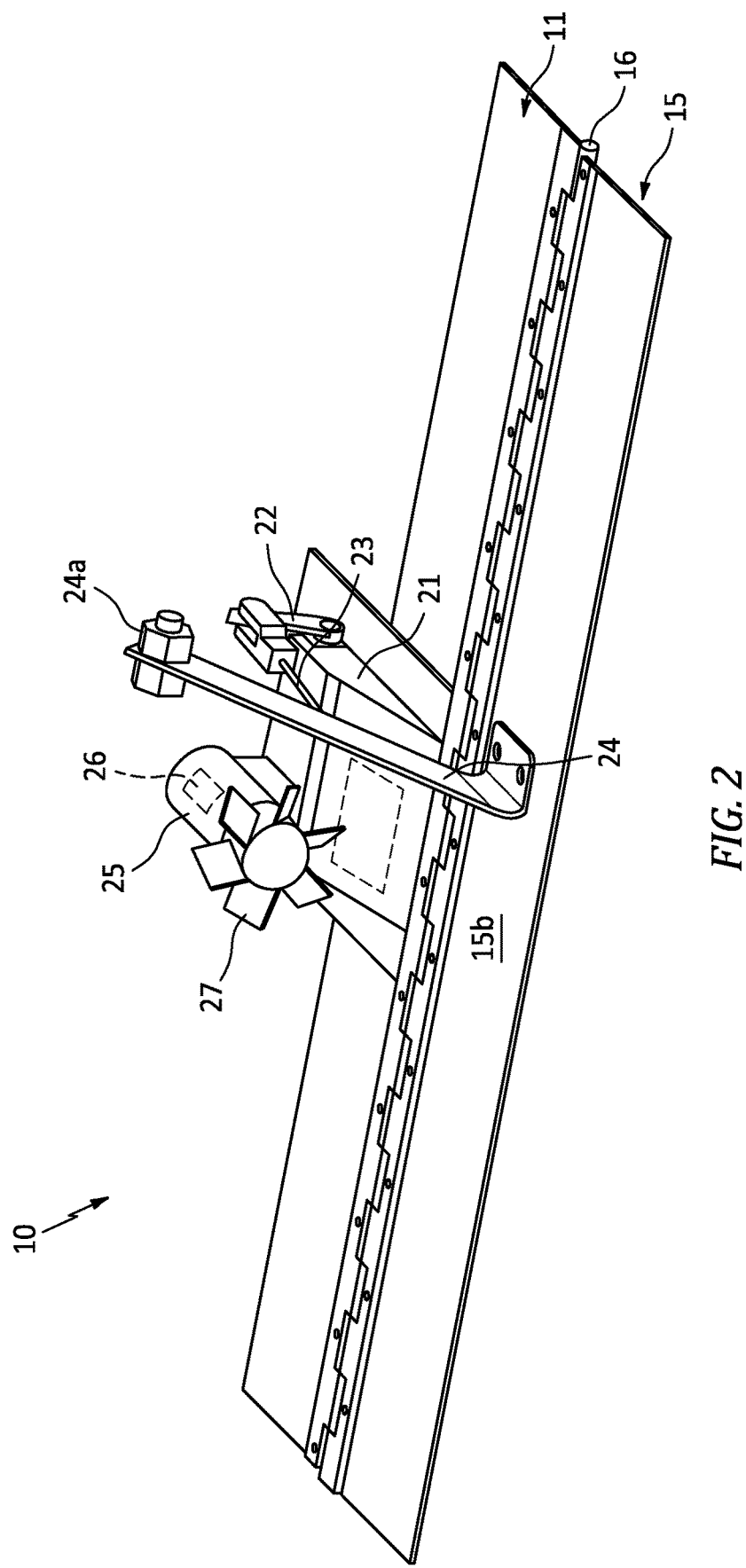
FIG. 2 is a bottom view of the flight control device of the autopilot system, in accordance with one embodiment of the invention.

As shown at FIG. 2, the flight control device 20 can include a main body 21 for housing a servo 22, a power generation unit 25 and a system controller 30.

The main body 21 can function to house the electronic components of the control device. To this end, the main body can include any number of different shapes and sizes that form an interior space into which the system components can reside.

In one embodiment, an electrical servo 22 can be positioned along the main body 21 and can be communicatively linked to the below described power and control systems.

The servo 22 can also be connected to an elongated rod 23 that connects to a counter balance bracket 24 on the airfoil 15.

As shown, the rod 23 can be connected along a middle portion of the bracket 24, so as to permit the second end of the bracket to extend diagonally from the rod. In one embodiment, a weight 24a can be positioned along the distal end of the bracket. The weight and bracket functioning as a counter balancing device to prevent excess movement by the airfoil 15 to prevent a phenomenon known as flutter.

As described herein, the servo 22 can include any number of commercially available components capable of imparting a force of between about 1 Newton and 50 Newtons, for example, onto the rod 23 and/or airfoil 15. Such force being sufficient to effectuate movement of the airfoil in order to allow the system to change the orientation of the aircraft during flight. One example of a suitable servomotor for use herein includes the Model HS-40 Nano Gear Servo that is commercially available from Hitec RCD USA, Inc. Of course, any number of other components are also contemplated herein.

In one embodiment, a power generation unit 25 can be positioned along the main body 21 and can function to generate power for use during flight and/or for storage within an onboard battery. In the preferred embodiment, the power generation unit can include a brushless DC generator 26 that is connected to a rotating blade assembly 27 positioned along the main body 21. During flight, air flowing along the main body causes the blade assembly 27 to spin. This mechanical rotational force is transferred to the generator 26 where it is converted into electric energy that is then transferred to the controller 30.

Although described as including specific components and locations along the main body, those of skill in the art will recognize that any number of other components and locations are contemplated so as to utilize airflow caused by the movement of the aircraft to generate power for the system components.

Figure 3:
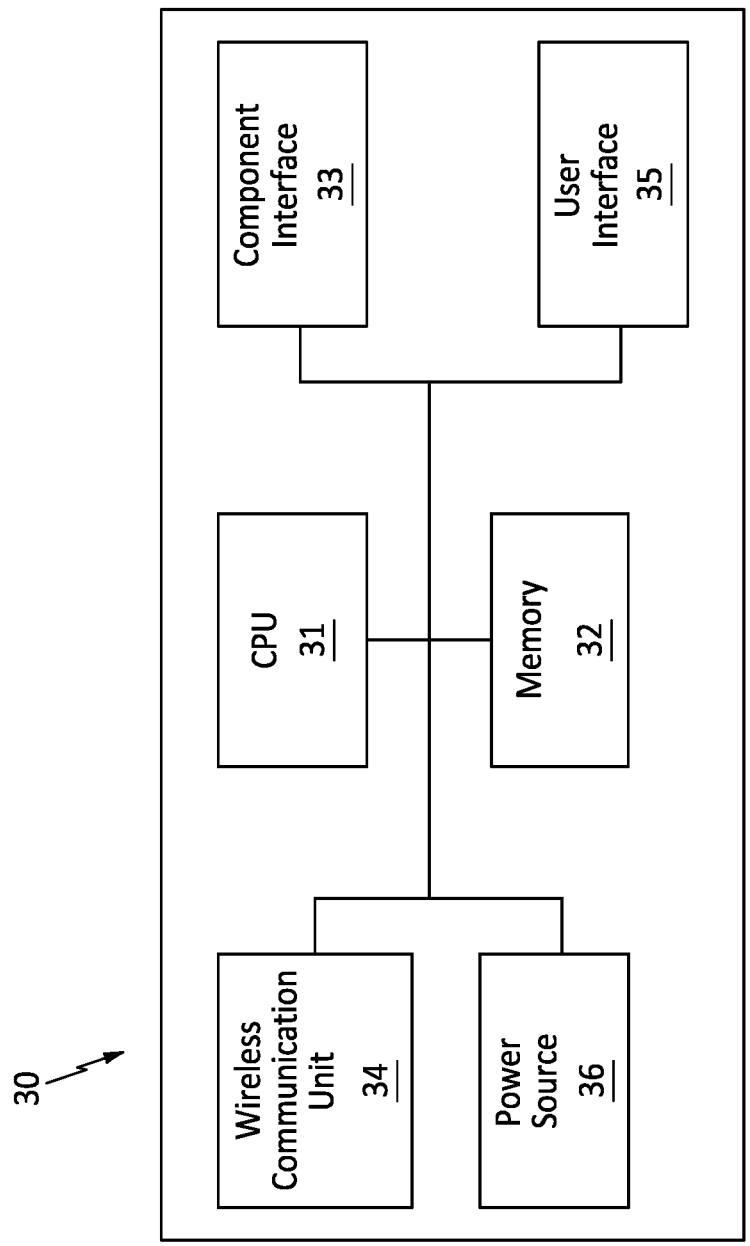
FIG. 3 is a simplified block diagram of the internal controller of the autopilot system, in accordance with one embodiment of the invention.

FIG. 3 is a simplistic block diagram illustrating one embodiment of the system controller 30, which can send and receive information with an externally located device and control the operation of the servo 22. As shown, the controller can include a processing unit 31 that is conventionally connected to an internal memory 32, a component interface unit 33, a wireless communication unit 34, a user interface 35, and/or a power source 36.

Although illustrated as separate elements, those of skill in the art will recognize that one or more system components 31-36 may comprise or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the described functionality can be provided in place of, or in conjunction with the described elements.

The processing unit 31 can include one or more central processing units (CPU) or any other type of device, or multiple devices, capable of manipulating or processing information such as program code stored in the memory 32 in order to allow the device to perform the functionality described herein.

Memory 32 can act to store operating instructions in the form of program code for the processing unit 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. The bulk storage device can contain any number of different programs that permit the processor to perform the functionality described herein, such as controlling the operation of the servomotor 22, for example. Additionally, memory 32 can also include one or more cache memories that provide temporary storage of at least some program codes in order to reduce the number of times program code must be retrieved from the bulk storage device during execution.

The component interface unit 33 can function to provide a communicative link between the processing unit 31 and various system elements such as the servomotor 22, the power generation unit 25 and the communication unit 34, for example. In this regard, the component interface unit can include any number of different components such as one or more PIC microcontrollers, standard bus, internal bus, connection cables, and/or associated hardware such as USB cables and connectors, and other such hardware capable of linking the various components. Of course, any other means for providing the two way communication between the system components can also be utilized herein.

The communication unit 34 can include any number of components capable of sending and/or receiving electronic signals with another device, either directly or over a network. In one preferred embodiment, the communication unit 34 can include a WIFI transceiver for communicating wirelessly with an external device such as the illustrated computer tablet 1 or smartphone, for example. Such a feature allowing a user to remotely communicate with and control the operation of the system 10 in order to change the orientation of the aircraft to which the system 10 is secured.

Of course, the communication unit is not limited to a WIFI transceiver and/or the use of WIFI signals, as any number of other devices capable of conducting wireless transmission and reception of signals can also be utilized herein. Several nonlimiting examples include Bluetooth, Near-Field-Communication (NFC) devices, and radio, for example.

The user interface 35 can include or comprise any number of physical components capable of sending and/or receiving information with a user. In one embodiment, the user interface can include one or more physical buttons or switches that can be located along the main body 21 and connected to the processing unit 31 to selectively activate different programmatic functions. For example, one such button can act to initiate programming for instructing the processing unit 31 to transition the device between an ON and OFF operating state, initiate a sleep mode, and/or to pair the communication unit 34 with an external device, among others. Additionally, the user interface can include or control one or more communication ports such as a Universal Serial Bus or micro USB port, for example, in order to send and receive information with another device via a direct communication link.

The power source 36 can include any number of different voltage and/or current regulating devices capable of providing the necessary power requirements to each element of the system. In various embodiments, the power source can include, or can be connected to one or more batteries that can be located within the main body 21. In one embodiment, the batteries can be permanently located within the main body and can be rechargeable in nature via induction charging and/or a charging port for example. Of course, the batteries can also be removable in nature via a battery compartment cover (not illustrated) for allowing a user to access the same. Additionally, the power source can comprise, or can be communicatively linked to the power generation unit 25.

In operation, the wireless autopilot system 10 can be communicatively linked to a computer program or mobile application 2 (i.e., App) which can be downloaded or otherwise installed onto an externally located device 1 such as the above noted tablet, PC, smartphone or other form of processor enabled device, for example. In this regard, the App can generate any number of display screens for allowing a user to communicate securely and directly with one or more individual autopilot systems 10 and 10' that are installed onto an aircraft (See FIG. 6).

More specifically, a user can command the App to instruct the servomotor 22 to move, thus resulting in a change to the orientation of the aircraft during flight. In this manner, the App can function as a standalone autopilot controller allowing a pilot to fly a certified aircraft to which the system 10 is installed over a wireless interface.

Although described above as including direct communication between the autopilot system 10 and the App 2 for controlling the aircraft, other embodiments are also contemplated. For example, the system 10 can also communicate with any number of other externally located systems that also perform wireless communication. One suitable example of such a system includes the Broadcast Outer Module (BOM) system that is commercially available from Levil Technologies, along with the Broadcast Outer Module mobile application, for example.

To this end, the system 10 can function to communicate directly with the Broadcast Outer Module so as to allow the BOM's associated mobile application to control the operation of the autopilot system. Such a feature providing a pilot with an integrated display showing aircraft data readings from the BOM, and the ability to fly the aircraft via the autopilot system from a single wireless device.

Figure 4:
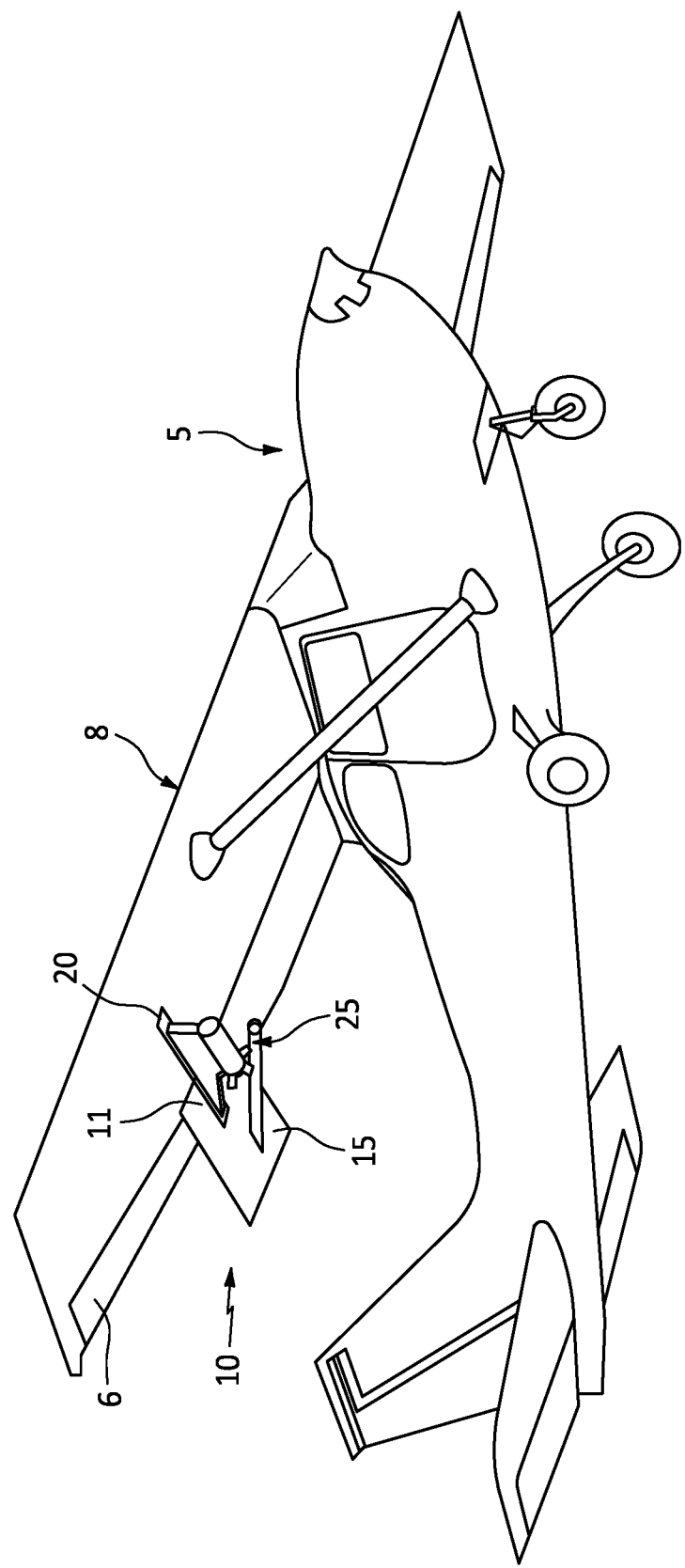
FIG. 4 is a perspective view of the autopilot system in operation, in accordance with one embodiment of the invention.

FIG. 4 illustrates one embodiment of the wireless autopilot system 10 that is secured onto an aircraft 5. As shown, the aircraft attachment device 11 can function to secure the flight control device 20 along the trailing edge of one of the aircraft's flight control surfaces such as the aileron 6 and/or elevator 7, for example. When so positioned, a user can wirelessly instruct the device 20 to manipulate the orientation of the steering tab 22 via the servomotor 22, thus causing the airfoil 15 to move in a manner that changes the orientation of the aircraft during flight.

Figure 5A:
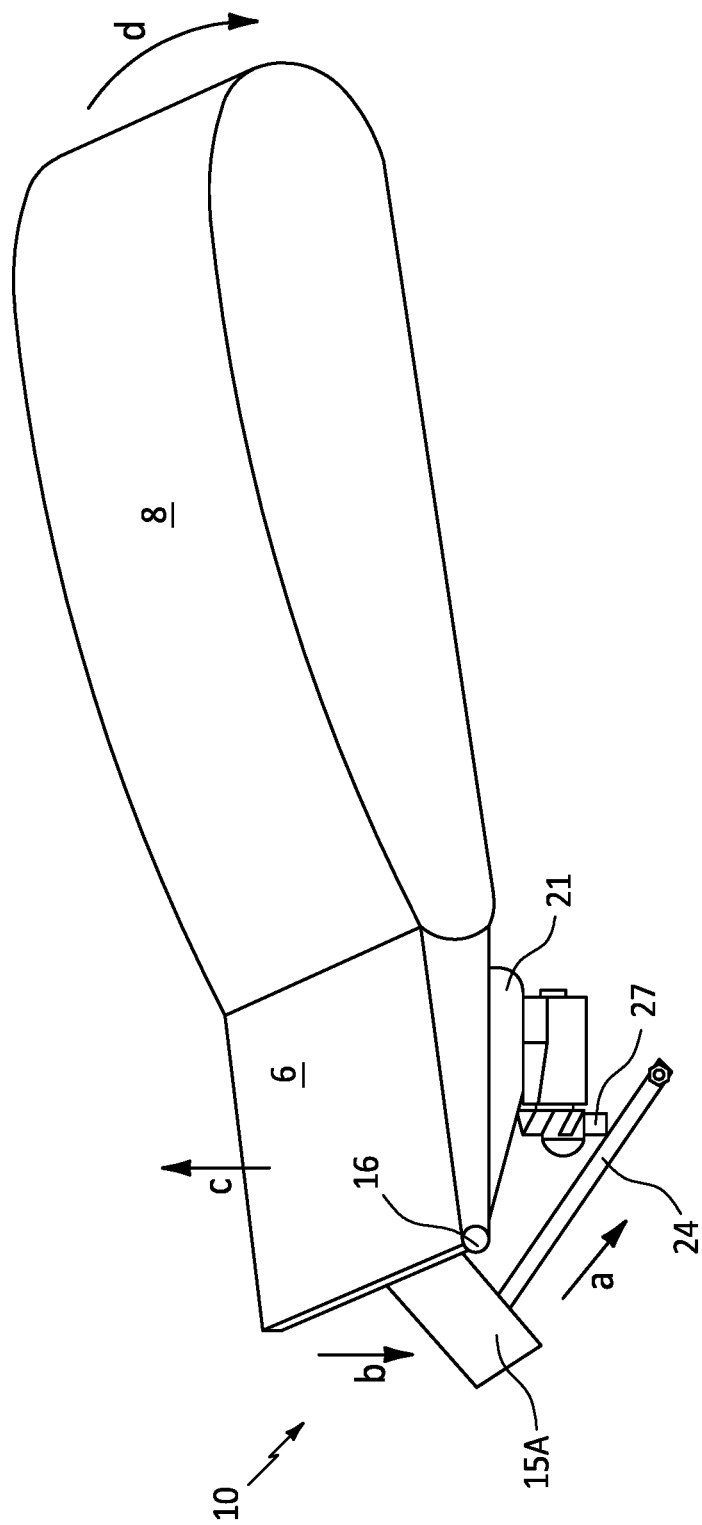
FIG. 5A is a partial cutout view of the autopilot system in operation, in accordance with one embodiment of the invention.
Figure 5B:
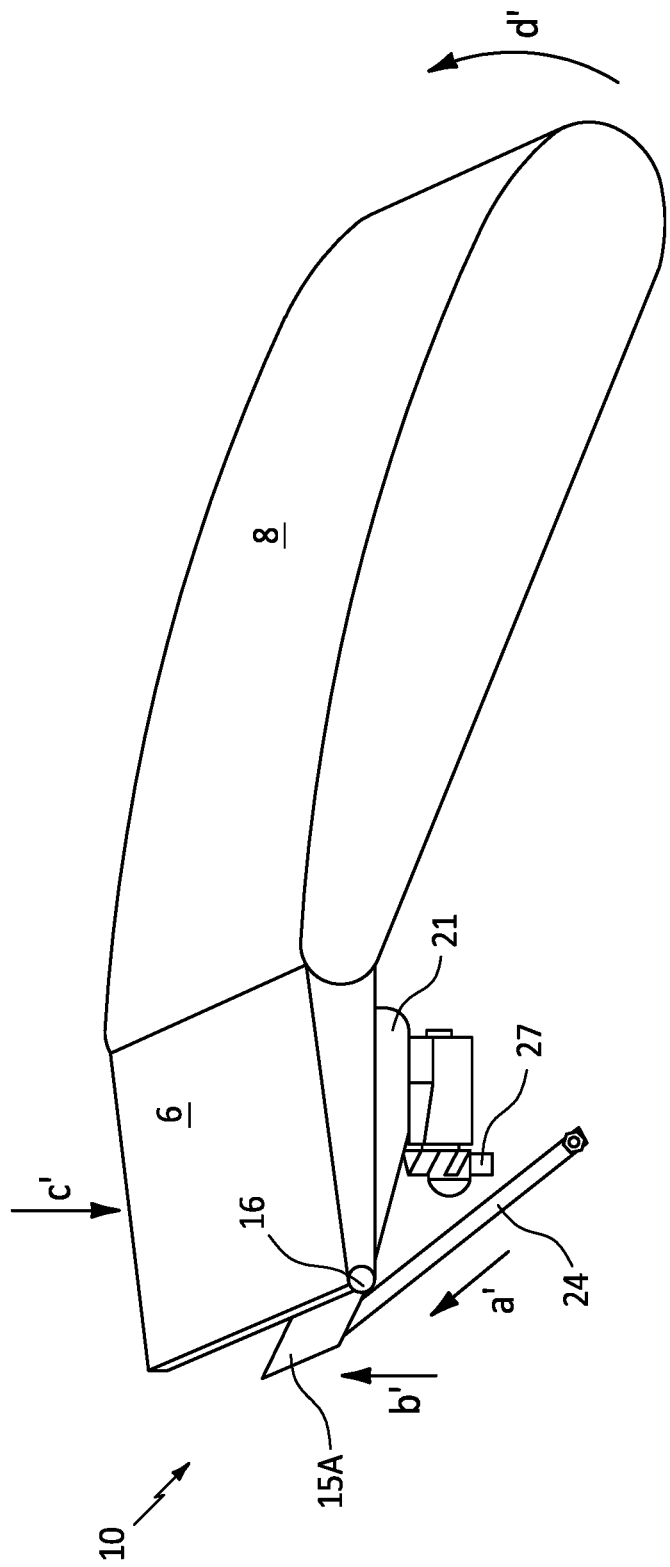
FIG. 5B is another partial cutout view of the autopilot system in operation, in accordance with one embodiment of the invention.

Cutout FIGS. 5A and 5B illustrate one embodiment of the operation of the wireless autopilot system 10 during flight. In the illustrated example, the system 10 is secured onto the aileron 6 of an aircraft that has been trimmed to the neutral position along the wing 8 for level flight. As shown by arrow a, upon receiving a command from a user, the servomotor 22 can selectively pull the rod and bracket 24 toward the direction of flight, thus causing the airfoil 15 to be deflected downward as shown by arrow b.

As air passes over the lowered airfoil, a low-pressure zone is formed along the top surface of the airfoil, thus causing the control surface 6 to lift as shown at arrow c. This movement results in a corresponding low-pressure zone to be formed beneath the aircraft control surface and wing 8, thus causing the wing to angle downward as shown at arrow d. This force being sufficient to lower the wing surface thus causing a change the orientation of the aircraft.

Conversely, as shown by arrow a', upon receiving a command from a user, the servomotor 22 can selectively push the rod and bracket 24 away from the direction of flight, thus causing the airfoil 15 to angle upward as shown by arrow b'. As air passes over the raised airfoil, a low-pressure zone is formed along the bottom surface of the airfoil, thus causing the control surface 6 to rotate downward as shown at arrow c'. This movement results in a corresponding low-pressure zone to be formed above the aircraft control surface and wing 8, thus causing the wing to angle upward as shown at arrow d'. This upward angle/lift being sufficient to raise the wing surface, thus causing a change to the orientation of the aircraft.

As such, it is noted that the direction of movement of the airfoil 15 is the same as the resulting movement of the wing to which the system is secured. Moreover, movement of the control surface 6 is caused solely by the air passing over the system components, and the deflection of the air caused by the airfoil 15.

Figure 6:
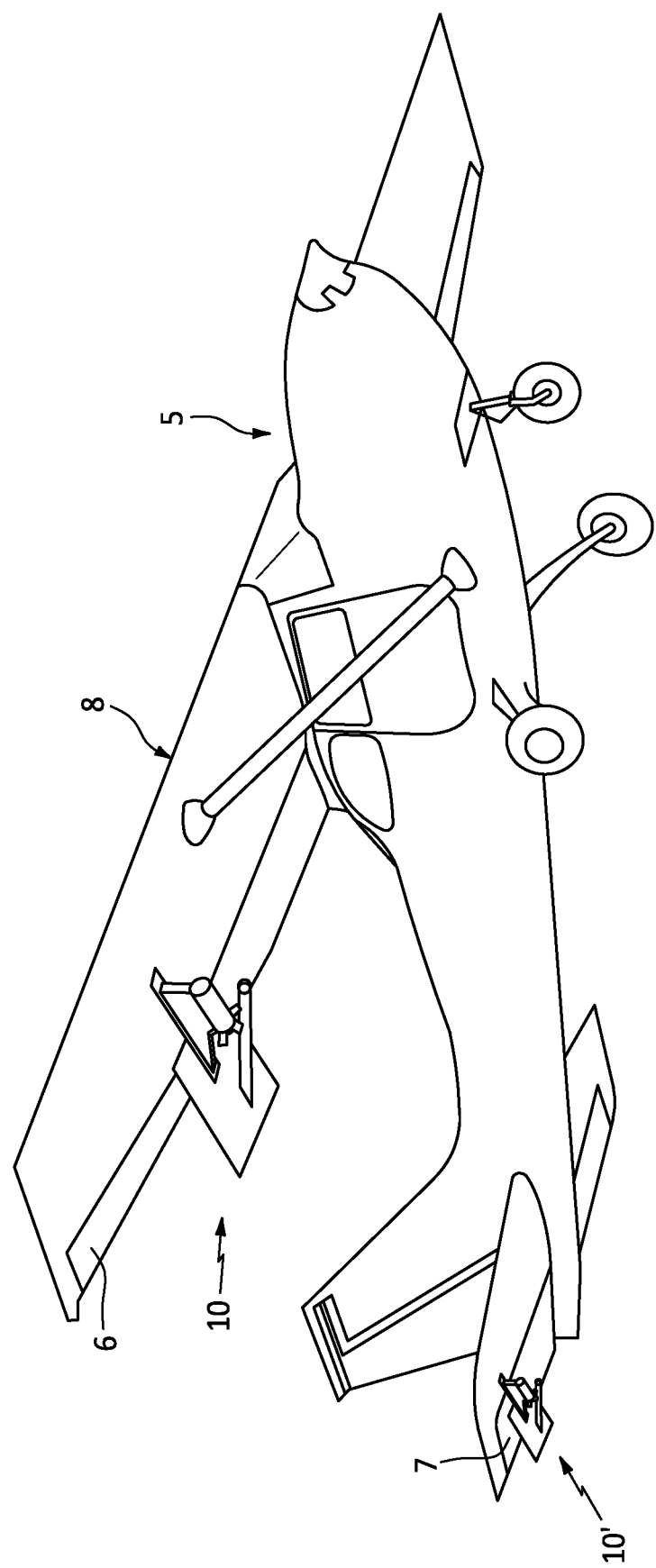
FIG. 6 is another perspective view of the autopilot system in operation, in accordance with one embodiment of the invention.

Although described above as including a single system 10 that is positioned along the aileron 6, the inventive concepts also contemplate the use of multiple identical autopilot systems 10 and 10' which can be secured to the aircraft along both the elevator 6 and aileron 7 as shown at FIG. 6.

As shown at Table 1, movement of system 10 secured along one of the ailerons 6 results in a change to the roll of the aircraft, thus changing the direction of flight. Likewise, movement of system 10', secured along one of the elevators 7 results in a change to the pitch of the aircraft, thus changing the aircrafts altitude.

TABLE 1

| User Command | Aircraft control surface | Steering tab deflection | Airfoil movement |
| --- | --- | --- | --- |
| decrease altitude | elevator | up | up |
| increase altitude | elevator | down | down |
| left turn | right aileron | up | up |
| right turn | right aileron | down | down |
| left turn | left aileron | down | down |
| right turn | left aileron | up | up |

Accordingly, the wireless autopilot system 10 can remain completely isolated from the certified aircraft systems and can create a separate and independently operable control surface (e.g., the airfoil 15) to change the orientation of flight.

In the preferred embodiment, the mounting plate 11 can include a width (e.g., distance between left and right sides) of between about 4 inches to 24 inches, which represents between about 5% to 25% of the width of the aircraft control surface to which the system is to be secured.

In the preferred embodiment, the airfoil 15 can include a width (e.g., distance between left and right sides) that is complementary to the width of the mounting plate 11, and a length (e.g., distance between leading edge 15c and trailing edge 15d) of between about 1.5 inches to 10 inches, which represents between about 5% to 25% of the length of the aircraft control surface (e.g., aileron or elevator) of the aircraft to which the system is to be secured.

Such dimensions being suitable for securement to the flight control surfaces of most commercially available small (e.g., rated for about 4 occupants) general aviation (e.g., certified aircraft) and experimental aircraft such as those produced by Cessna®, Piper®, Velocity® and Long EZ, for example.

To this end, the specific ratio of the system components 10 to the aircraft's control surfaces are an important factor to allow the system to steer the aircraft, but without affecting the normal flight operations of the aircraft when the pilot moves the stick. More specifically, because the installed system is sized so as to only affect a low percentage of the aircrafts' control surface, movements of the control surface by the pilot through the aircraft controls are not affected. As such, the system 10 does not need to be turned off or otherwise adjusted when such movements by the control surface are made by the pilot.

Additionally, because the power required to utilize the controller and servo are so low, the power generation unit is sufficient to provide power to the same for as long as the aircraft is in flight. Such a feature ensuring continuous operation of the system regardless of how many hours each flight takes.

As described herein, one or more elements of the wireless autopilot system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An autopilot system, comprising:
    a mounting plate that is configured to engage a flight control surface of an aircraft;
    an airfoil having a leading edge that is hingedly secured to a trailing edge of the mounting plate;
    a main body that is positioned along the mounting plate, said main body extending outward from a bottom surface of the mounting plate, and including a hollow interior space;
    a servomotor that is positioned on the main body, said servomotor including functionality for moving a position of the airfoil; and
    a controller that is communicatively linked to the servomotor, said controller including a transceiver for communicating wirelessly with an external device,
    wherein movement of the airfoil during flight results in a movement of the flight control surface and a change to an orientation of the aircraft during the flight.

2. The system of claim 1, wherein the controller includes functionality for receiving a wireless instruction from the external device, and for instructing the servomotor to move the position of the airfoil based upon the wireless instruction.

3. The system of claim 1, wherein the mounting plate is removably secured onto the flight control surface of the aircraft by a connector.

4. The system of claim 1, wherein the mounting plate is permanently secured onto the flight control surface of the aircraft by a connector.

5. The system of claim 1, wherein an upward movement of the airfoil during flight causes a downward movement of the flight control surface.

6. The system of claim 1, wherein a downward movement of the airfoil during flight causes an upward movement of the flight control surface.

7. The system of claim 1, further comprising:
    an elongated bracket having a first end that is connected to the airfoil.

8. The system of claim 7, wherein the servomotor is connected to a middle section of the elongated bracket by a rod.

9. The system of claim 8, further comprising:
    a weight that is disposed along a second end of the elongated bracket.

10. The system of claim 9, wherein the second end of the elongated bracket is perpendicular to the rod.

11. The system of claim 1, wherein the controller further comprises;
    a memory;
    a user interface; and
    a processor,
    wherein the processor is in communication with each of the transceiver, the memory, and the user interface.

12. The system of claim 11, wherein the memory is encoded with instructions for pairing the transceiver to the external device.

13. The system of claim 1, wherein the flight control surface is an elevator, and wherein an upward movement of the airfoil during flight causes a downward movement of the elevator, causing a decrease in an altitude of the aircraft.

14. The system of claim 1, wherein the flight control surface is an elevator, and wherein a downward movement of the airfoil during flight causes a upward movement of the elevator, causing an increase in an altitude of the aircraft.

15. The system of claim 1, wherein the flight control surface is a right aileron, and wherein an upward movement of the airfoil during flight causes a downward movement of the right aileron, causing a left turn of the aircraft.

16. The system of claim 1, wherein the flight control surface is a right aileron, and wherein a downward movement of the airfoil during flight causes an upward movement of the right aileron, causing a right turn of the aircraft.

17. The system of claim 1, wherein the flight control surface is a left aileron, and wherein an upward movement of the airfoil during flight causes a downward movement of the left aileron, causing a right turn of the aircraft.

18. The system of claim 1, wherein the flight control surface is a left aileron, and wherein a down movement of the airfoil during flight causes an upward movement of the left aileron, causing a left turn of the aircraft.

19. An autopilot system, comprising:
a mounting plate that is configured to engage a flight control surface of an aircraft;
an airfoil having a leading edge that is hingedly secured to a trailing edge of the mounting plate;
a main body that is positioned along the mounting plate;
a servomotor that is positioned on the main body, said servomotor including functionality for moving a position of the airfoil; and
a controller that is communicatively linked to the servomotor, said controller including a transceiver for communicating wirelessly with an external device; and
an elongated bracket having a first end that is connected to the airfoil,
wherein the servomotor is connected to a middle section of the elongated bracket by a rod, and
wherein movement of the airfoil during flight results in a movement of the flight control surface and a change to an orientation of the aircraft during the flight.

* * * * *